Z. C. KETCHUM.
MARKING TAG FOR ANIMALS OR BIRDS.
APPLICATION FILED JULY 6, 1920.

1,382,091.                              Patented June 21, 1921.

INVENTOR
ZEBULUM C. KETCHUM

UNITED STATES PATENT OFFICE.

ZEBULUM COLVIN KETCHUM, OF OTTAWA, ONTARIO, CANADA.

MARKING-TAG FOR ANIMALS OR BIRDS.

1,382,091.          Specification of Letters Patent.    Patented June 21, 1921.

Original application filed April 2, 1919, Serial No. 287,005. Divided and this application filed July 6, 1920. Serial No. 394,016.

*To all whom it may concern:*

Be it known that I, ZEBULUM COLVIN KETCHUM, a subject of the King of Great Britain, a resident of the city of Ottawa, Province of Ontario, Dominion of Canada, have invented certain new and useful Improvements in Marking-Tags for Animals or Birds, of which the following is a specification.

This invention relates to improvements in marking tags for animals or birds, and is a division of my United States application No. 287,005, filed April 2nd, 1919, and the objects of the invention are to render the tag adaptable for use on either animals or birds, to so construct the tag that when placed on the ear of an animal and closed thereon, an air space will be left around the tag to prevent festering of the wound, and the same results are also applicable to the use of the tag when placed through the wing of a bird, and it consists essentially of the improved construction of tag particularly described and set forth in the following specification and accompanying drawings forming part of the same.

In the drawings.

Like characters of reference refer to like parts in the several figures.

The tag A which I utilize for marking animals or fowls is shown both in the open or closed position and consists of a U-shaped member 10 having an offset point 11, the other end of the U-shaped member being slightly offset inwardly as shown at 12 to form a stop which will rest against the ear of the animal or wing of a fowl.

When the member 10 is inserted and clamped in position on the animal or fowl it cannot fall out or become displaced, and the offset end 12 engages with the ear of the animal spacing the tag from the ear and allowing the circulation of air around the wound, thereby preventing festering of the wound.

Figure 1:
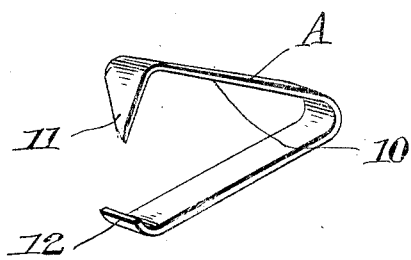
Figure 1 is a perspective view of the improved tag as seen when open.
Figure 2:
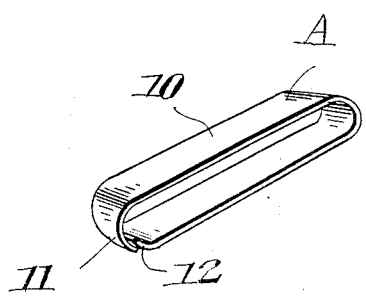
Fig. 2 is a perspective view of the tag when closed.

When pressure is brought to bear on the tag during closing of same, the pointed end 11 is bent around the curvilinear offset end 12 as shown in Fig. 2 so that a positive locking of the two arms of the tag is thus accomplished.

The tag is manufactured from strips of metal bent in the same manner above described, and the owner's name may be typed thereon.

As many changes could be made in the above construction and many widely different embodiments of my invention within the scope of the claim, constructed without departing from the spirit or scope thereof, it is intended that all matter contained in the accompanying specification and drawings shall be interpreted as illustrative and not in a limiting sense.

What I claim as my invention is:

A tag comprising a U-shaped strip of material having one end bent laterally and formed with a V-shaped point and having the other end offset in a curvilinear manner, adapted to fit closely to and support the V-shaped point when bent around the same.

In witness whereof I have hereunto set my hand.

ZEBULUM COLVIN KETCHUM.